(12) United States Patent
Larson et al.

(10) Patent No.: US 10,437,601 B2
(45) Date of Patent: Oct. 8, 2019

(54) CENTRALIZED MEMORY MANAGEMENT FOR MULTIPLE DEVICE STREAMS

(71) Applicant: Microsoft Technology Licensing, LLC, Redmond, WA (US)

(72) Inventors: Christian P. Larson, Kirkland, WA (US); Mei L. Wilson, Redmond, WA (US); Fabin Shen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 15/713,096

(22) Filed: Sep. 22, 2017

(65) Prior Publication Data

US 2019/0004808 A1 Jan. 3, 2019

Related U.S. Application Data

(60) Provisional application No. 62/527,552, filed on Jun. 30, 2017.

(51) Int. Cl.
*G06F 9/38* (2018.01)
*G06F 12/06* (2006.01)
*G06F 15/167* (2006.01)

(52) U.S. Cl.
CPC ........ *G06F 9/3851* (2013.01); *G06F 12/0692* (2013.01); *G06F 15/167* (2013.01)

(58) Field of Classification Search
None
See application file for complete search history.

(56) References Cited

U.S. PATENT DOCUMENTS

| | | | |
|---|---|---|---|
| 6,023,712 A * | 2/2000 | Spear | G06F 9/5016 |
| 6,070,168 A | 5/2000 | Jacuzio | |
| 6,434,610 B1 | 8/2002 | Wahl | |
| 7,461,148 B1 | 12/2008 | Beloussov et al. | |
| 7,895,363 B2 | 2/2011 | Schmidt | |
| 8,296,542 B2 | 10/2012 | Knirsch | |
| 8,782,371 B2 | 7/2014 | Prebble | |
| 9,152,532 B2 * | 10/2015 | Breternitz | G06F 11/3495 |

(Continued)

OTHER PUBLICATIONS

Pawar, et al., "Priority Based Dynamic resource allocation in Cloud Computing", In Proceedings of International Conference on Intelligent Systems and Signal Processing, Mar. 1, 2013, 6 pages.

*Primary Examiner* — Eric Coleman

(74) *Attorney, Agent, or Firm* — Arent Fox LLP

(57) ABSTRACT

Described are examples for allocating buffers for multiple components. A stream server can provide an interface to a centralized memory allocator for allocating at least one buffer in a memory to each of the multiple components. The stream server can initialize an instance of the centralized memory allocator based at least in part on a request received from a component of the multiple components via the interface. The stream server can allocate, via the instance of the centralized memory allocator, the at least one buffer for the component in the memory. The stream server can receive, via the instance of the centralized memory allocator, data for storing in the at least one buffer. The stream server can modify the data to generate modified data stored in the at least one buffer.

20 Claims, 6 Drawing Sheets

(56) References Cited

U.S. PATENT DOCUMENTS

| | | | |
|---|---|---|---|
| 2010/0332401 A1* | 12/2010 | Prahlad | G06F 16/1844 |
| | | | 705/80 |
| 2012/0089579 A1* | 4/2012 | Ranade | G06F 16/1744 |
| | | | 707/693 |
| 2013/0066815 A1 | 3/2013 | Oka et al. | |
| 2013/0346499 A1* | 12/2013 | Spencer | H04L 65/403 |
| | | | 709/204 |
| 2014/0006354 A1* | 1/2014 | Parkison | G06F 3/0611 |
| | | | 707/649 |
| 2014/0165119 A1* | 6/2014 | Liu | H04N 21/232 |
| | | | 725/92 |
| 2014/0289205 A1* | 9/2014 | Shigeta | H04L 47/2475 |
| | | | 707/660 |
| 2014/0294080 A1* | 10/2014 | Kurihara | H04N 19/40 |
| | | | 375/240.16 |
| 2015/0181002 A1 | 6/2015 | Lee et al. | |
| 2016/0246972 A1* | 8/2016 | Cidon | G06F 21/62 |
| 2016/0314023 A1* | 10/2016 | Shum | G06F 9/5083 |
| 2016/0353062 A1* | 12/2016 | Ono | H04N 7/142 |

* cited by examiner

CENTRALIZED MEMORY MANAGEMENT FOR MULTIPLE DEVICE STREAMS

CLAIM OF PRIORITY UNDER 35 U.S.C. § 119

The present application for patent claims priority to Provisional Application No. 62/527,552, entitled "CENTRALIZED MEMORY MANAGEMENT FOR MULTIPLE DEVICE STREAMS" filed Jun. 30, 2017, which is assigned to the assignee hereof and hereby expressly incorporated by reference herein for all purposes.

BACKGROUND

Many computing devices employ input devices that produce output streams for consumption by applications operating on the computing device. These input devices can include sensor devices (e.g., cameras, biometric devices, etc.) that obtain and output data in streams including a plurality of data frames, where the data frames are output at a specific rate (e.g., a number of frames per second). A given input device is typically associated with a component at the operating system of the computing device, such as a driver, a driver extension, etc., that provides an interface to the input device allowing applications executing via the operating system to access and utilize the output stream for a given input device, to control the input device, etc. Currently, the components (e.g., drivers, driver extensions, etc.) request memory allocation from the operating system (e.g., kernel) for storing data received from the input device. Requests may or may not be granted based on available system resources. In addition, the components are thus responsible for managing memory contents, requesting deallocation of the memory, etc. As more input devices or corresponding components request buffers for outputting data on a computing device, this memory model may become inefficient in requesting multiple allocations, may not adequately allow for sharing memory and/or corresponding data across components, etc.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a method for allocating buffers for multiple components is provided. The method includes providing, by a stream server, an interface to a centralized memory allocator for allocating at least one buffer in a memory to each of the multiple components, initializing, by the stream server, an instance of the centralized memory allocator based at least in part on a request received from a component of the multiple components via the interface, allocating, by the stream server via the instance of the centralized memory allocator, the at least one buffer for the component in the memory, receiving, by the stream server via the instance of the centralized memory allocator, data for storing in the at least one buffer, modifying, by the stream server, the data to generate modified data stored in the at least one buffer, receiving, by the stream server via the instance of the centralized memory allocator, a request from the component to deallocate the at least one buffer, and allocating, based on receiving the request from the component to deallocate the at least one buffer, at least a portion of memory previously allocated to the at least one buffer to another buffer for another component.

In another example, a device for allocating buffers for multiple components is provided. The device includes a memory storing one or more parameters or instructions for executing a stream server, wherein the stream server interfaces with the multiple components, and at least one processor coupled to the memory. The at least one processor is configured to provide an interface to a centralized memory allocator for allocating at least one buffer in the memory to each of the multiple components, initialize an instance of the centralized memory allocator based at least in part on a request received from a component of the multiple components via the interface, allocate, via the instance of the centralized memory allocator, the at least one buffer for the component in the memory, receive, via the instance of the centralized memory allocator, data for storing in the at least one buffer, modify the data to generate modified data stored in the at least one buffer, receive, via the instance of the centralized memory allocator, a request from the component to deallocate the at least one buffer, and allocate, based on receiving the request from the component to deallocate the at least one buffer, at least a portion of memory previously allocated to the at least one buffer to another buffer for another component.

In another example, a computer-readable medium including code executable by one or more processors for allocating buffers for multiple components is provided. The code includes code for providing, by a stream server, an interface to a centralized memory allocator for allocating at least one buffer in a memory to each of the multiple components, initializing, by the stream server, an instance of the centralized memory allocator based at least in part on a request received from a component of the multiple components via the interface, allocating, by the stream server via the instance of the centralized memory allocator, the at least one buffer for the component in the memory, receiving, by the stream server via the instance of the centralized memory allocator, data for storing in the at least one buffer, modifying, by the stream server, the data to generate modified data stored in the at least one buffer, receiving, by the stream server via the instance of the centralized memory allocator, a request from the component to deallocate the at least one buffer, and allocating, based on receiving the request from the component to deallocate the at least one buffer, at least a portion of memory previously allocated to the at least one buffer to another buffer for another component.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

Figure 1:
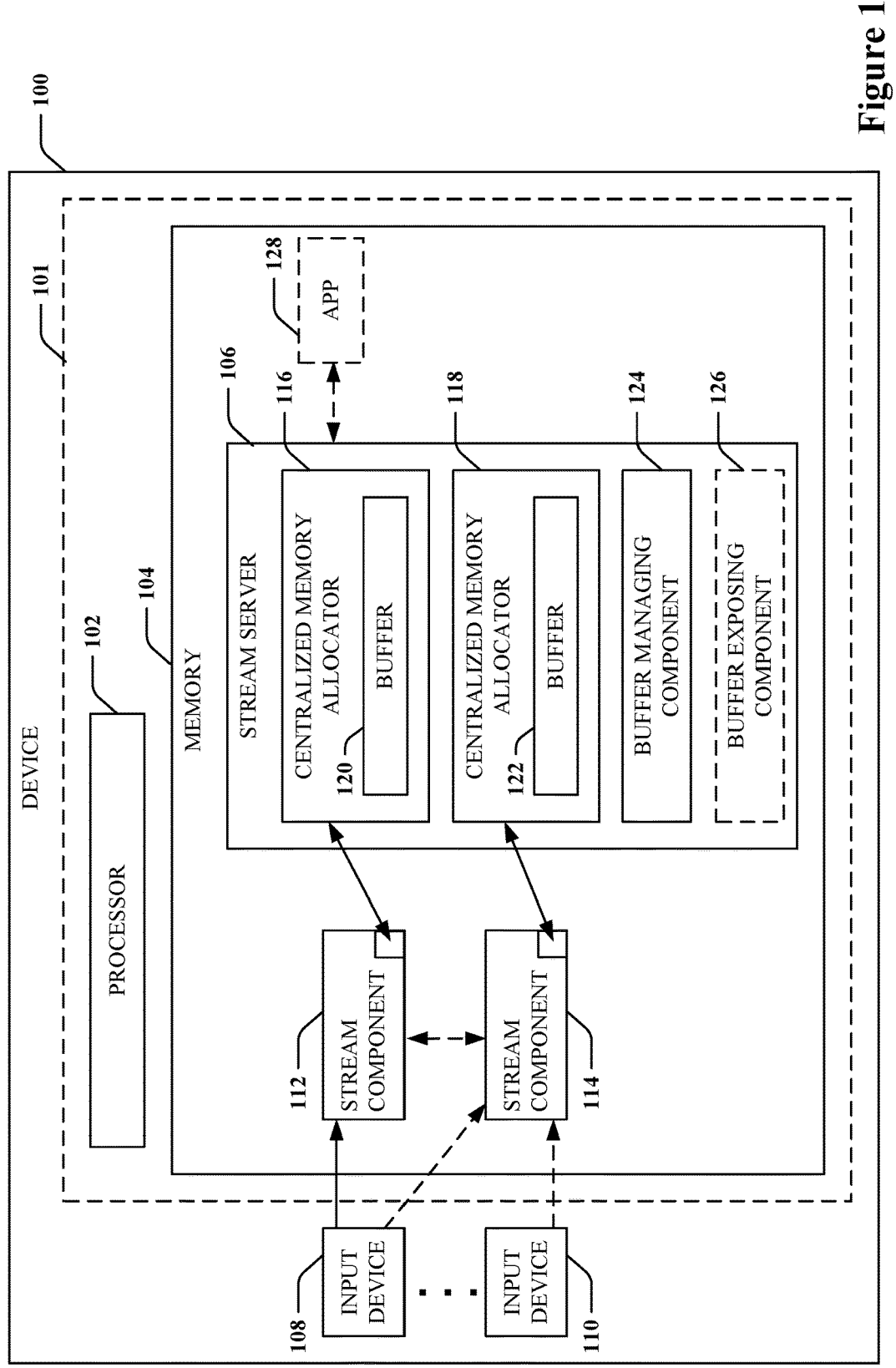
FIG. 1 is a schematic diagram of an example of a device for managing memory for multiple stream components.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing centralized memory management for data from multiple device streams. For example, a stream server on a computing device may support multiple components, which can include drivers, driver extensions, media foundation transforms (MFTs), etc., related to one or more input devices. The input devices may also be referred to as sensor devices, and may include cameras or other biometrics sensors, position determining devices, location determining devices, gyroscopes, accelerometers, or substantially any device that can provide input data at a cadence or rate (e.g., a number of frames per second). The stream server may expose a centralized memory allocator via an interface, and multiple components can request initialization of an instance of the centralized memory allocator to access a buffer on the stream server for storing and/or retrieving data corresponding a given component. In this regard, the stream server can manage aspects of buffers allocated to each of multiple components via the centralized memory allocator, which may reduce complexity of handling memory at the components, reduce an overall memory footprint, allow for simplified memory sharing among various components, allow the stream server to modify data for the components, and/or the like.

In a specific example, each component can request initialization of a respective instance of the centralized memory allocator. The components can also request allocation of a buffer via the respective instance of the centralized memory allocator.

The stream server can manage the centralized memory allocators and can manage the associated buffers in various regards. For example, the stream server can modify data received for storage via a respective centralized memory allocator to include one or more flags indicating the data is managed by the centralized memory allocator, one or more flags indicating that the data is shareable with other components, and/or other flags. Also, in an example, the centralized memory allocator can compress or decompress the data before storing in the buffer. In another example, the stream server can modify a size of one or more of the buffers, agnostically to the respective component, to achieve dynamic allocation of various buffers. For example, the stream server may decrease a size of one buffer and increase a size of another buffer (e.g., allocated to another component), such as where one component is using more memory than another component. Moreover, for example, the stream server may associate the same buffer with different instances of the centralized memory allocator to save from creating multiple buffers for the same data.

Figure 2:
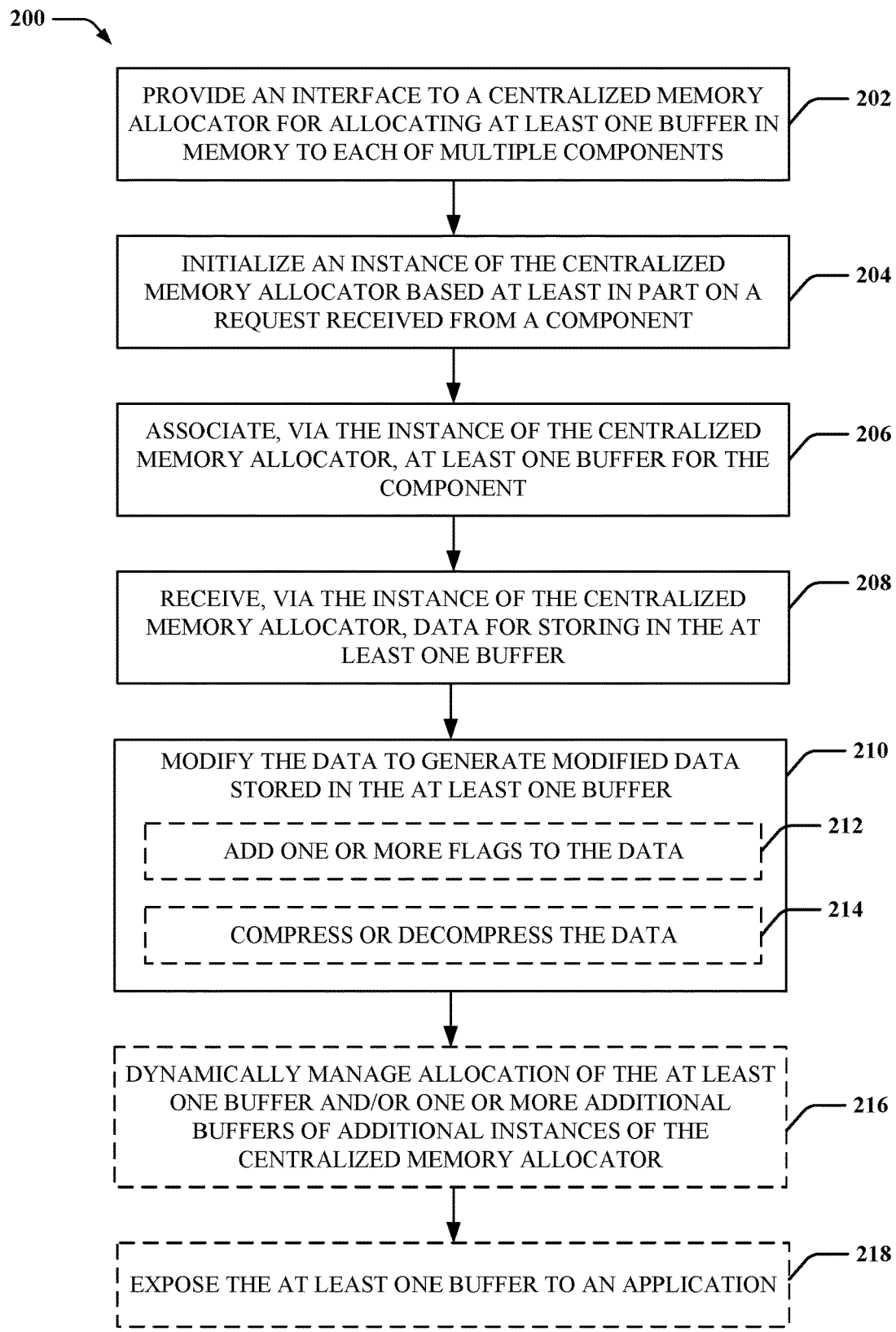
FIG. 2 is a flow diagram of an example of a method for managing memory for multiple stream components.
Figure 3:
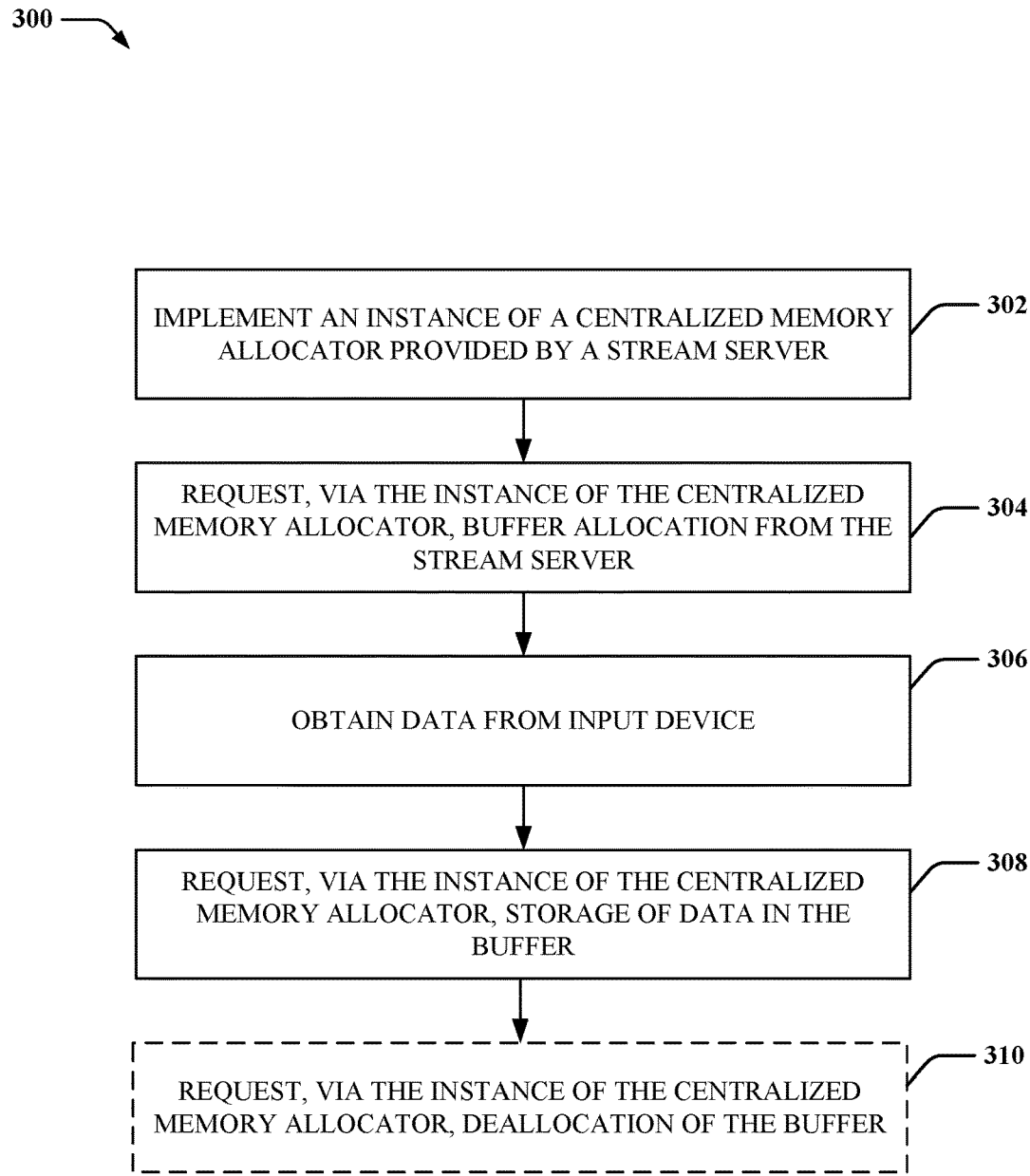
FIG. 3 is a flow diagram of an example of a method for requesting buffer allocation and data storage via a centralized memory allocator.
Figure 4:
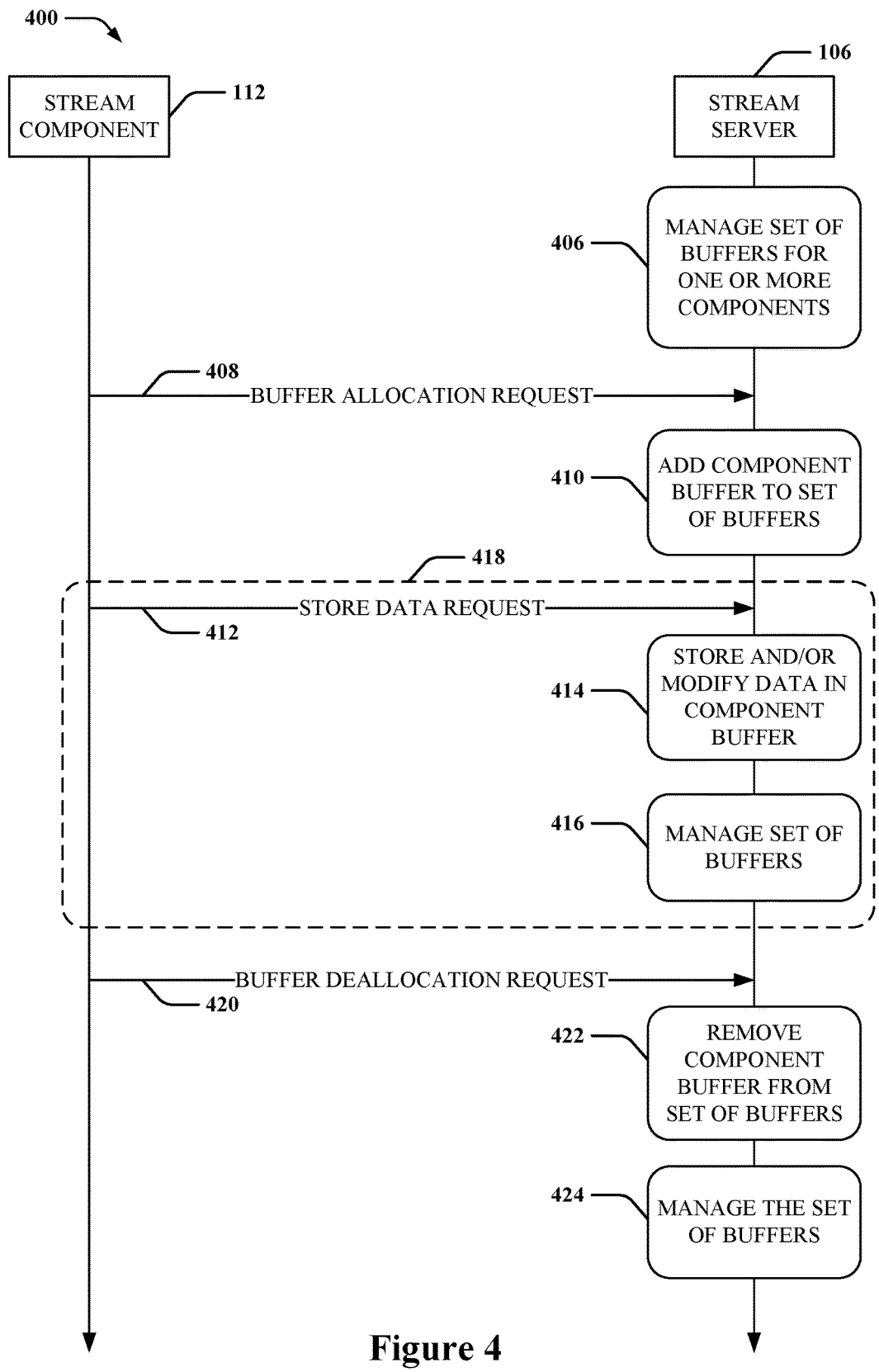
FIG. 4 is a schematic diagram of an example operation of a system for managing a set of buffers for multiple stream components.

Turning now to FIGS. 1-6, examples are depicted with reference to one or more components and one or more methods that may perform the actions or operations described herein, where components and/or actions/operations in dashed line may be optional. Although the operations described below in FIGS. 2-4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can implement a stream server for storing and providing access to data from streams of multiple input devices. In an example, device 100 can include a processor 102 and/or memory 104 configured to execute or store instructions or other parameters related to providing the stream server 106. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component 101), and/or the like. Memory 104 may store instructions, parameters, data structures, etc., for use/execution by processor 102 to perform functions described herein. Device 100 can also include one or more input devices 108, 110 as stream sources for providing data stream output (e.g., video output, audio output, biometric output or other output that can be obtained in frames of data, etc.). For example, the one or more input devices 108, 110 may include one or more sensor devices (e.g., a red, green, blue (RGB) camera, infrared (IR) camera, depth camera, etc.), which may be video cameras, still image cameras, etc., an eye scan or eye tracking sensor, a fingerprint or touch sensor, a microphone, etc. For example, the input devices 108, 110 may be internal or external to the device 100, and may be communicatively coupled to the computing device via substantially any wired or wireless interface (e.g., universal serial bus (USB), Firewire, local area network (LAN), wireless LAN (WLAN), Bluetooth, radio frequency identification (RFID), near field communication (NFC), etc.).

In an example, stream server 106 can obtain output streams (e.g., streams of framed data) of input devices 108, 110 via corresponding stream components 112, 114. For example, the stream components 112, 114 may correspond to drivers, driver extensions, MFTs, etc., related to one of input devices 108, 110. In one example, each input device 108, 110 can have at least one stream component 112, 114. In other examples, an input device 108 may have more than one stream component 112, 114. In additional example, stream component 114 may be an extension of stream component 112, and/or the like, where stream component 114 may modify and output data received from stream component 112. For example, stream components 112, 114 may operate at an operating system level for receiving and/or outputting data from one or more input devices 108, 110, and thus may include one or more drivers, driver extensions, etc. In another example, stream components 112, 114 may be part of stream server 106 and/or initialized by the stream server 106 based on a request from one or more applications 128, and may include one or more MFTs (e.g., for data decoding, frame conversion, etc.), and/or the like. In one example, an operating system can initialize a driver, driver extension, etc. as a stream component 112 for receiving data from the one or more input devices 108, 110, controlling the one or more input devices 108, 110, etc. In addition, in an application 128 can utilize stream server 106 to access the stream component 112 and/or can request initialization of another stream component 114, such as a MFT, for receiving data from one or more input devices 108, 110, and/or can request related decoders, converters, etc. that cause stream server 106 to establish the MFTs, etc.

In examples described further herein, stream server 106 can expose an interface to a centralized memory allocator, and at least one stream component 112 can implement an instance of a centralized memory allocator 116 via the interface. In addition, for example, one or more additional stream components 114 can also implement an instance the centralized memory allocator 118 via the interface. The instances of the centralized memory allocators 116, 118 can allow the corresponding stream components 112, 114 to allocate respective buffers 120, 122 that are manageable by the stream server 106, and provide a handle to the corresponding buffer 120, 122 back to the corresponding stream component 112, 114. Examples described herein may refer to one of the stream components (e.g., stream component 112) for ease of explanation, but other (e.g., alternative and/or additional) stream components (e.g., stream component 114) can similarly be used in the examples as well.

For example, stream components 112, 114 can utilize the corresponding instances of centralized memory allocators 116, 118 to request buffer allocation. For example, stream component 112 can perform a call of a function or procedure to allocate the buffer via an interface provided by the respective instance of the centralized memory allocator 116. In this example, centralized memory allocator 116 can accordingly request allocation of buffer 120 based on the function or procedure call, and buffer managing component 124 can allocate a portion of memory 104 to the buffer 120. Similarly, for example, centralized memory allocator 118 can request allocation of buffer 122, and buffer managing component 124 can allocate a portion of memory 104 to the buffer 122. In another example, buffer 122 may instead be a handle to an already established buffer, such as buffer 120, already established and allocated via another centralized memory allocator 116. In any case, as the buffers 120, 122 are controlled by the stream server 106, buffer managing component 124 can manage certain aspects of the buffers 120, 122. For example, buffer managing component 124 can manage a size of the buffers 120, 122 agnostically to (e.g., without input from and/or without necessarily providing output to) the stream components 112, 114 such to provide additional memory 104 to one buffer over the other (e.g., where the corresponding stream component 112, 114 operates at a higher frame rate, outputs larger sized frames, etc.). Additionally, for example, buffer managing component 124 can manage a size of the buffers 120, 122 such to allow allocation of additional buffers for additional centralized memory allocators without exceeding a total memory budget for the centralized memory allocators.

Additionally, for example, stream components 112, 114 can utilize the corresponding instances of centralized memory allocators 116, 118 to store data from input devices 108, 110 in respective buffers 120, 122. For example, stream component 112 can perform a call of a function or procedure to store data in the buffer 120 via an interface provided by the respective instance of the centralized memory allocator 116. In this example, centralized memory allocator 116 can accordingly store the data in the buffer 120 and/or can modify the data before or after storing the data. For example, centralized memory allocator 116 may add one or more flags to the data to indicate that the data is managed by the centralized memory allocator, to indicate that the data is shareable with other components, etc. In other examples, centralized memory allocator 116 may include or access one or more algorithms to perform a compression or decompression of the data before or after storing the data in the buffer 120.

In another example, stream components 112, 114 can utilize the corresponding instances of centralized memory allocators 116, 118 to request buffer deallocation. For example, stream component 112 can perform a call of a function or procedure to deallocate the buffer 120 via an interface provided by the respective instance of the centralized memory allocator 116. In this example, centralized memory allocator 116 can accordingly deallocate buffer 120, and buffer managing component 124 may keep the memory allocated for allocating to another buffer, such as buffer 122, a buffer of another centralized memory allocator (e.g., currently or subsequent initialized), etc., which can mitigate frequent allocation and deallocation of memory at the stream server 106.

In one example, stream server 106 may allow for sharing of buffers 120, 122 (e.g., between stream components 112, 114, application 128, etc.) to allow interoperability of the corresponding data (e.g., to provide temporal correlation of the data, to generate aggregated streams including data from both stream components 112, 114, etc.). In addition, for example, stream server 106 may include a buffer exposing component 126 that exposes an interface for accessing data in the one or more buffers 120, 122. Thus, for example, an application 128 may access one or more of the buffers 120, 122 (or other buffers including data generated based on data in buffers 120, 122), which may include accessing data as compressed, decompressed, flagged, etc., in the one or more buffers 120, 122. Moreover, centralized memory allocators 116, 118 can allow for allocating multiple buffers for each stream component 112, 114 for storing separate data, where each of the multiple buffers can be managed, modified, shared, etc., as described above.

FIG. 2 is a flowchart of an example of a method 200 for using a centralized memory allocator for managing memory for multiple device streams. For example, method 200 can be performed by a device 100 and/or one or more components thereof to facilitate multiplexing multiple stream sources.

In method 200, at action 202, an interface to a centralized memory allocator can be provided for allocating at least one buffer in memory to each of multiple components. In an example, stream server 106, e.g., in conjunction with processor 102, memory 104, etc., can provide the interface to the centralized memory allocator for allocating at least one buffer 120, 122 in memory 104 for each of multiple components (e.g., stream components 112, 114). For example, stream server 106 can expose the interface via an application programming interface (API) as a class or interface that can be implemented by one or more components importing the API, such as stream components 112, 114. In this example, stream component 112 can implement an instance of the centralized memory allocator 116, which can at least partially execute on, or otherwise access resources of, stream server 106 such that stream server 106 can manage one or more aspects of buffers being allocated by various instances of the centralized memory allocator implemented by various stream components.

In method 200, at action 204, an instance of the centralized memory allocator can be initialized based at least in part on a request received from a component. In an example, stream server 106, e.g., in conjunction with processor 102, memory 104, etc., can initialize the instance of the centralized memory allocator 116, 118 based at least in part on the request received from the component (e.g., respective stream component 112, 114). For example, stream server 106 may initialize each instance based on the respective stream component 112, 114 implementing the interface or class of the centralized memory allocator exposed or otherwise provided by the stream server 106. In any case, once the instance is initialized, stream component 112, 114 can receive a memory pointer, handle, or other mechanism for calling various functions, processes, etc., of the centralized memory allocator.

In method 200, at action 206, at least one buffer for the component can be associated via the instance of the centralized memory allocator. In an example, stream server 106, e.g., in conjunction with processor 102, memory 104, buffer managing component 124, etc., can associate, via the instance of the centralized memory allocator 116, 118, at least one buffer (e.g., buffer 120, 122) for the component (e.g., stream component 112, 114). In an example, buffer managing component 124 can reserve a portion of memory 104 for allocating buffers for each of multiple instances of the centralized memory allocator. For instance, buffer managing component 124 can allocate the buffer 120, 122 for the respective stream component 112, 114, which may include buffer managing component 124 using resources previously allocated to another stream component via another instance (e.g., currently or previously initialized) of the centralized memory allocator. Moreover, for example, buffer managing component 124 may determine a size of the buffer 120, 122 to allocate based on one or more parameters related to the stream component 112, 114, such as a frame rate, size or type of frames/framed data, etc. In any case, buffer managing component 124 can handle any backend allocating/deallocating of memory 104 for the buffers 120, 122, and/or dynamic reallocation of the buffers 120, 122 within already allocated memory 104, etc. In another example, buffer managing component 124 can associate an already established buffer with the component (e.g., associate buffer 122, established for stream component 114, with stream component 112) where similar data is to be provided to the component as for a component for which the buffer was established.

In method 200, at action 208, data for storing in the at least one buffer can be received via the instance of the centralized memory allocator. In an example, stream server 106, e.g., in conjunction with processor 102, memory 104, etc., can receive, via the instance of the centralized memory allocator 116, 118, data for storing in the at least one buffer 120, 122. For example, stream component 112 can perform a function or procedure call via an interface of the instance of the centralized memory allocator 116 for storing data from one or more input devices, such as input device 108, in buffer 120. For example, the data may correspond to one or more images captured by a camera, which may be received at a frame rate (e.g., a number of frames per second), and stream component 112 can request storage of each frame, as received, in buffer 120 (for at least a period of time, or for example pursuant to a first-in-first-out or other automatic purging property of the buffer 120), via the instance of the centralized memory allocator 116.

In method 200, at action 210, the data can be modified to generate modified data stored in the at least one buffer. In an example, stream server 106, e.g., in conjunction with processor 102, memory 104, etc., can modify the data to generate the modified data stored in the at least one buffer 120. For example, stream server 106 can modify the data to ease accessing of the data by one or more other stream components or applications, to enable synchronizing or sharing of the data among, to indicate that the data is being managed by a centralized memory allocator, etc. For example, modifying the data can optionally include, at action 212, adding one or more flags to the data. For example, stream server 106, e.g., in conjunction with processor 102, memory 104, etc., can add the one or more flags to the data, which may include a binding flag indicating that the data is being stored by a centralized memory allocator (which may facilitate certain assumptions for sharing or otherwise synchronizing the data among stream components). In another example, the one or more flags may include a flag indicating that the data is shareable among stream components (e.g., to facilitate correlation of the data with data from other stream components).

In another example, modifying the data can optionally include, at action 214, compressing or decompressing the data. For example, stream server 106, e.g., in conjunction with processor 102, memory 104, etc., can compress or decompress the data. For example, stream server 106 may receive the data from stream component 112 in a compressed joint photographic experts group (JPEG) format, and may decompress the JPEG before, upon, or after storing the JPEG in buffer 120. For example, stream server 106 may decompress the JPEG upon request from the stream component 112 or otherwise. In a similar example, stream component 112 may compress an uncompressed JPEG from stream component 112 for storing in buffer 120. In other examples, stream server 106 can encode, secure, or perform other operations (e.g., reformatting) on data being stored into buffer 120, where the operations can occur independently of stream component 112 after the stream server 106 receives the data for storing from the stream component 112. In one example, stream server 106 can modify the data by storing a portion of the data to provide a higher latency, or lower quality, feed to one or more applications (e.g., based on a permission level of the application to access data from the stream server 106 or, specifically, of an input device 108 corresponding to the stream component 112).

In method 200, optionally at action 216, the at least one buffer and/or one or more additional buffers of additional instances of the centralized memory allocator, can be dynamically managed. In an example, buffer managing component 124, e.g., in conjunction with processor 102, memory 104, stream server 106, etc., can dynamically manage allocation of the at least one buffer 120, 122 and/or one or more additional buffers of additional instances of the centralized memory allocator. For example, buffer managing component 124 can dynamically allocate, deallocate, reallocate, etc., memory to one or more buffers of one or more instances of the centralized memory allocator. In one example, the instance of the centralized memory allocator 116 may request deallocation of buffer 120, and buffer managing component 124 may reserve the memory allocated to buffer 120 for another currently or subsequently established buffer.

For example, buffer managing component 124 can also reallocate memory among buffers 120, 122 to satisfy memory and/or throughput requirements of the corresponding stream components 112, 114 where possible. For example, buffer managing component 124 may determine that buffer 120 has data up to a threshold capacity, that buffer 120 has data up to the threshold capacity a threshold number of times over a period of time, that the corresponding stream component 112 stores a certain type of data in buffer 120, that the corresponding stream component 112 stores data at or above a certain frame rate, payload size, etc., and/or the like. In this example, buffer managing component 124 can determine to increase a memory size of the buffer 120, which can include reallocating memory from buffer 122 (if it is determined that buffer 122 can be shrunk based on similar considerations regarding data size of data in the buffer, frame rate, payload size, etc.). In another example, buffer managing component 124 may reserve additional memory from memory 104 to increase a memory size of buffer 120. In any case, buffer managing component 124 can control the buffer size agnostic to (e.g., independently of) input from and/or output to) the corresponding stream component 112.

In method 200, optionally at action 218, the at least one buffer can be exposed to an application. In an example, buffer exposing component 126, e.g., in conjunction with processor 102, memory 104, stream server 106, etc., can expose the at least one buffer 120, 122 to the application 128. For example, buffer exposing component 126 can expose an interface for accessing the at least one buffer 120, 122, and/or one or more other buffers including data based on the data stored in the at least one buffer 120, 122. Thus, in one example, stream server 106 can modify the data being stored in the buffer 120, as described above, to facilitate access by the application 128 (e.g., decompressing a compressed JPEG from the stream component 112 for easier access by the application 128).

FIG. 3 is a flowchart of an example of a method 300 for using a centralized memory allocator for managing memory by a stream component. For example, method 300 can be performed by a stream component 112, 114 for operating an instance of a centralized memory allocator to store stream data.

In method 300, at action 302, an instance of a centralized memory allocator provided by a stream server can be implemented. In an example, stream component 112, 114, e.g., in conjunction with processor 102, memory 104, etc., can implement the instance of the centralized memory allocator 116, 118 provided by the stream server 106. For example, stream component 112 can implement the instance of the centralized memory allocator 116 by importing the centralized memory allocator, and implementing a class of the centralized memory allocator. In any case, at least a portion of the centralized memory allocator can execute on the stream server 106 to allow the stream server 106 to manage one or more buffers 120, 122 allocated to the instance of the centralized memory allocator 116, as described.

In method 300, at action 304, buffer allocation from the stream server can be requested via the instance of the centralized memory allocator. In an example, stream component 112, 114, e.g., in conjunction with processor 102, memory 104, etc., can request, via the instance of the centralized memory allocator 116, 118, buffer allocation (e.g., of buffer 120, 122) from the stream server 106. For example, stream component 112, 114 can request allocation of the corresponding buffer 120, 122 from the stream server 106 for storing data from the stream component 112, 114. In this regard, the stream server 106 can allocate or associate the corresponding buffer 120, 122, as well as manage buffer association, allocation, reallocation, deallocation, etc., modification of data stored in the buffer, and/or the like, as described above.

In method 300, at action 306, data can be obtained from the input device. In an example, stream component 112, 114, e.g., in conjunction with processor 102, memory 104, etc., can obtain data from a corresponding input device 108, 110. For example, input device 108, 110 may be a camera or other device providing a stream of framed data (e.g., at a frame rate), which may include streams of images. In another example, input device 108, 110 may include audio devices, biometric devices, etc., providing streams of other data types.

In method 300, at action 308, storage of data in the buffer can be requested via the instance of the centralized memory allocator. In an example, stream component 112, 114, e.g., in conjunction with processor 102, memory 104, etc., can request, via the instance of the centralized memory allocator 116, 118, storage of data in the buffer 120, 122. As described, stream server 106 can accordingly store the data in the buffer 120, 122 and/or can modify the data before, as part of, or after storing the data in the buffer 120, 122. In one example, steam component 112 can call a function or procedure of the instance of the centralized memory allocator to store the data, or can store the data based on a handle to the corresponding buffer 120.

In method 300, optionally at action 310, deallocation of the buffer can be requested via the instance of the centralized memory allocator. In an example, stream component 112, 114, e.g., in conjunction with processor 102, memory 104, etc., can request, via the instance of the centralized memory allocator, deallocation of the buffer 120, 122. For example, stream component 112, 114 can request deallocation as part of a termination procedure for the stream component 112, 114, and the stream server 106 may accordingly manage the deallocation, as described, such that corresponding memory in memory 104 may be reallocated (as opposed to released back to the operating system/kernel.

FIG. 4 is a schematic diagram of an example of a system 400 including a stream server 106 that allocates memory and stores data, e.g., using a centralized memory allocator, for a stream component 112. Stream server 106 can manage a set of buffers for one or more components at 406. As described, stream server 106 can request and/or reserve a portion of memory for the set of buffers, and can manage allocation of the reserved memory for the set of buffers (e.g., increasing/decreasing allocations where determined to provide additional memory where needed to achieve a desired throughput, etc.). While the stream server 106 is managing buffers for one or more components, a stream component 112 can communicate a buffer allocation request 408 to the stream server, which may include communicating the request via an initialized instance of a centralized memory allocator on the stream server 106, as described above.

Based on the request, for example, stream server can add a component buffer for the stream component 112 to the set of buffers at 410. In this example, the stream server 106 can reallocate memory from a former buffer and/or decrease allocation to one or more of the one or more buffer in the set of buffers to the added component buffer.

In an example, stream server 106 can determine an amount of memory to allocate to the added component buffer based on one or more parameters of the stream component 112, such as a type of data or input device supported by the stream component 112, a frame rate, size, payload, etc., a desired or supported throughput, and/or the like. In addition, stream server 106 can similarly determine a decrease in allocation to one or more of the one or more buffers currently in the set for reallocating to the added component buffer based on similar determinations regarding stream components corresponding to the one or more of the one or more buffers in the set to be decreased in allocation.

With the buffer allocated for the stream component 112, the stream component 112 can communicate a store data request 412 to the stream server 106 to store data from an input device managed by the stream component 112, and stream server can accordingly store the data in the associated component buffer at 414. In an example, stream server may also modify the data stored in the component buffer at 414 (e.g., before, as part of, or after storing the data in the buffer). As described, for example, stream server 106 may modify the data by adding one or more flags to the data, compressing the data, decompressing the data, encoding or securing the data, etc. Stream server 106 can manage the set of buffers at 416 (similarly as described at 406) after storing the data. For example, stream server 106 may reallocate memory in managing the set of buffers at 416 to ensure stream components corresponding to the buffers have enough buffer space available to achieve throughput requirements. In addition, the process 418 of storing data and managing the buffers can occur multiple times between the stream component 112 (or other stream components) and stream server 106.

Stream component 112 can also communicate a buffer deallocation request 420 to the stream server 106 (e.g., as part of terminating the stream component 112). Stream server 106 can remove the component buffer from the set of buffers at 422, and can manage the set of buffers at 424 (similarly to managing the set of buffers at 406, 416). For example, stream server 106 can reallocate the memory previously allocated to the component buffer to other buffers in the set and/or reserve the memory for a subsequently allocated component buffer.

Figure 5:
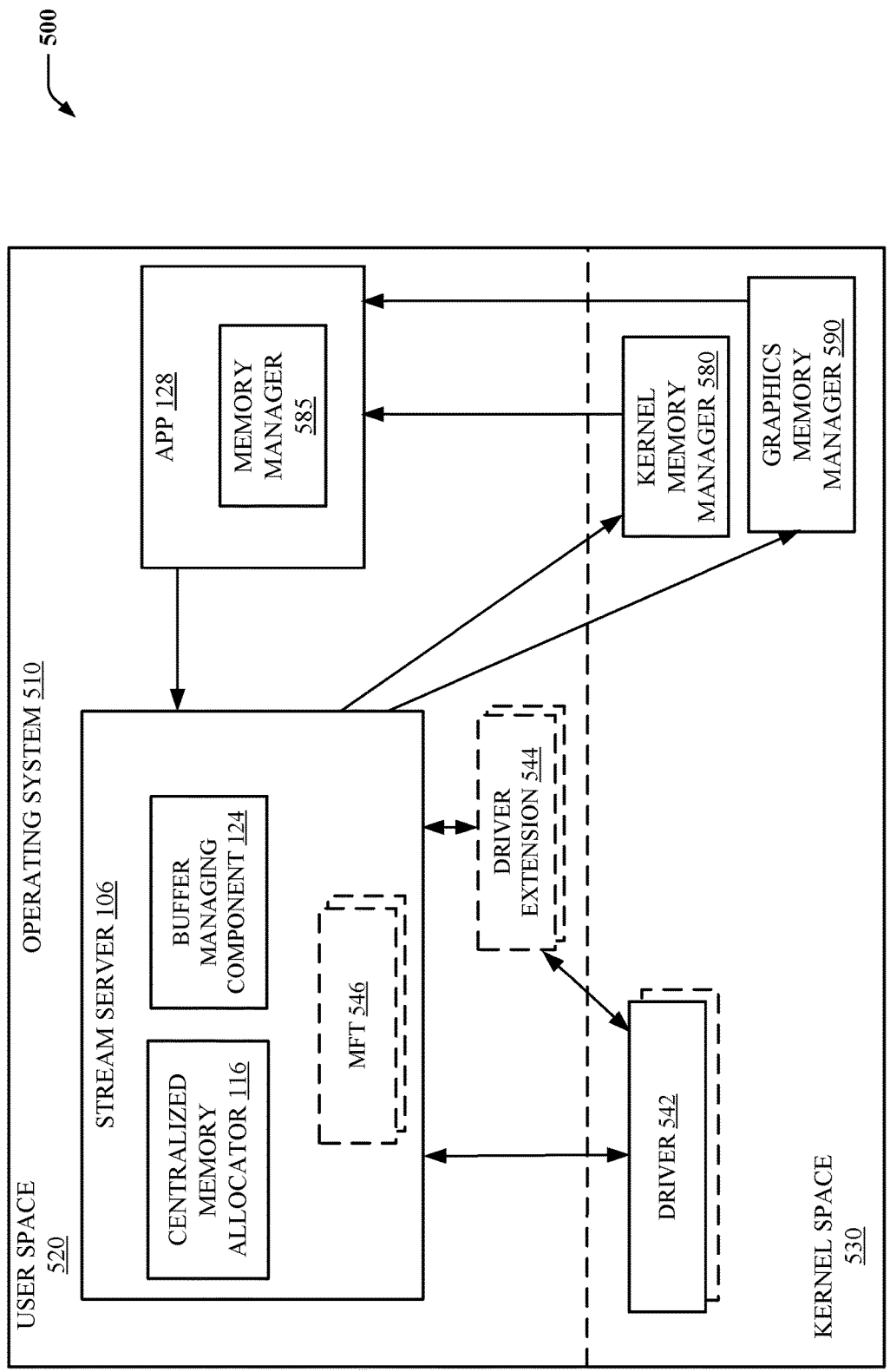
FIG. 5 is a schematic diagram of an example of a software architecture for implementing a stream server and stream components.

FIG. 5 is a system diagram of an example of a software architecture 500 for using a stream server 106 and/or corresponding stream components, for example, within a computing device such as device 100 (FIG. 1). An operating system (OS) 510 can manage the execution of applications 128, manage the exchange of information among the applications 128, and provide services for the applications 128, such as by providing an interface to hardware input devices (e.g., via driver(s) 542, driver extension(s) 544, MFT(s) 546, stream server 106, etc.). The OS 510 can also include a stream server 106, which can be used to manage transport of data from the resources of the stream server 106 to the applications 128. For example, software architecture 500 can be executed by a device 100 (e.g., via a processor 102, memory 104, etc.) to provide the implementations/examples described herein. As described, stream server 106 may include an instance of a centralized memory allocator 116, which can be implemented by implemented by one or more stream components, such as driver(s) 542, driver extension(s) 544, MFT(s) 546, etc., and a buffer managing component 124 to allow stream server 106 to manage buffers associated with instances of centralized memory allocators, as described.

The OS 510 can divide the memory (e.g., memory 104 of a device 100) into different spaces corresponding to different privilege levels, where higher privileged processes have more access to memory and services and lower privileged processes have less access to memory and services. For example, the OS 510 can divide the memory into a user space 520 and a kernel space 530. Applications (such as the application 128, stream server 106, driver extension(s) 544, etc.) and lower privileged software routines can operate in the user space 520 and higher privileged services of the OS 510 can operate in the kernel space 530, such as driver(s) 542, kernel memory manager 580, graphics memory manager 590, etc. Separating the memory into the user space 520 and the kernel space 530 can increase security, privacy, and fault tolerance of the OS 510 by limiting memory access of potentially faulty or malicious applications.

The OS 510 can include different software routines, modules, or components for managing different implementations of the execution of programs. For example, the OS 510 can include a stream server 106 for managing streaming data, a kernel memory manager 580 for managing virtual and physical memory, and a graphics memory manager 590 for managing graphics memory. For example, the kernel memory manager 580 can be used to create a virtual memory space for a new process or application when the process is started, to allocate the virtual memory for various purposes, and to map virtual addresses to physical addresses and/or locations in secondary storage. The kernel memory manager 580 can track the virtual to physical mappings using page tables. The kernel memory manager 580 can use physical memory that is located within the system memory that is closely coupled to a CPU. For example, the kernel memory manager 580 may include a driver to map memory across a process boundary such that stream server 106 can allocate buffers in the memory (e.g., at the request of memory manager 585 of one or more applications 128), and application 128 can access buffers from the memory using memory manager 585. The graphics memory manager 590 can be similar to the kernel memory manager 580, except that the graphics memory manager 590 can be used with graphics memory that is closely coupled to a GPU. Thus, the graphics memory manager 590 and the kernel memory manager 580 can operate on different non-overlapping portions of physical memory.

Driver(s) 542 for one or more input devices (not shown) can be used by the OS 510 to communicate with the input devices. For example, there can be multiple drivers (e.g., for each of multiple input devices), optional driver extensions 544 provided by the operating system 510 for modifying data received at driver(s) 542 or otherwise communicating input device data via corresponding driver(s) 542, etc., where the driver(s) 542 and/or driver extension(s) 544 can provide functionality of communicating with the corresponding input devices to receive input device data, control the input devices, etc. The driver(s) 542 and/or driver extension(s) 544 can be used to initialize and/or update registers of the input device so that the input device can be controlled. The driver(s) 542 and/or driver extension(s) 544 can be used to read the registers of the input device so that the OS 510 is aware of when data is available from the input device. The input device can also have embedded memory within the input device for storing data collected by the input device, and the driver(s) 542 and/or driver extension(s) 544 can be used to manage the transport of the data from the embedded physical memory to the OS 510.

In an example, stream server 106 can initialize one or more stream MFTs 546, which can communicate with one or more driver(s) 542, driver extension(s) 544, etc. to receive and store data from one or more input devices, as described. The MFTs 546 can modify data from the driver(s) 542, driver extension(s) 544, etc. to provide for data decoding, frame conversion, and/or the like. For example, stream server 106 can initialize the one or more stream components, as described, which can include one or more of driver(s) 542, driver extension(s) 544, MFT(s) 546, etc., based at least in part on a request from application 128 (e.g., a request to initialize the stream component, a request for data, a decoder, a frame converter, etc.) that causes initialization of an appropriate stream component, and/or the like. In any case, the one or more stream components can request a buffer via a centralized memory allocator 116, and may receive a handle to a buffer, which may be a newly allocated buffer, a buffer allocated for another stream component, etc. based on the data for which the stream component is initialized.

In one specific example, buffer managing component 124 can manage buffer allocation for the various stream components, including one or more driver(s) 542, driver extension(s) 544, MFT(s) 546, etc. Application 128 can specify, via memory manager 585, a preference of memory type to the stream server 106 (e.g., as part of initializing an interface to an input device corresponding to one of driver(s) 542, driver extension(s) 544, or MFT(s) 546). The preference can indicate whether the application 128 prefers system memory (e.g., as allocated via kernel memory manager 580) or graphics memory (e.g., corresponding to a GPU of a computing device, as allocated by graphics memory manager 590), and/or other preferences, such as data format, data size, etc. In an example, application 128 can specify the preference based on initializing, via memory manager 585, a graphics memory manager 590 on a pipeline, setting a preference variable when initializing or requesting initialization or usage of a stream component, etc. Stream server 106 can accordingly allocate memory for the application 128 using the appropriate memory manager 580, 590, which can provide a handle to the memory to memory manager 585 for use.

In addition, driver(s) 542 can indicate a memory preference to the stream server 106 as well, which stream server 106 may use for allocating memory for the driver 542 or corresponding input device using kernel memory manager 580 or graphics memory manager 590. Stream server 106 can accordingly initialize driver dependencies for the driver(s) 542, which can include initializing the input device, initializing one or more driver extension(s) 544, initializing one or more MFT(s) 546, etc. Stream server 106 can also add MFT(s) 546 for certain types of data requested by the application 128, which may include an MFT for decoding data from driver(s) 542, converting frames from driver(s) 542, etc., depending on the type of data requested by the application. In an example, the driver extension(s) 544 and/or MFT(s) 546 can also indicate a memory preference.

In any case, for example, driver(s) 542, driver extension(s) 544, and MFT(s) 546 can initialize an instance of centralized memory allocator 116 to receive buffer allocations for data from a corresponding input device. In addition, in this example, driver(s) 542, driver extension(s) 544, and MFT(s) 546 can request buffer allocation via the corresponding instances of the centralized memory allocator 116. Buffer managing component 124 can allocate buffers, which may use memory from kernel memory manager 580 and/or graphics memory manager 590, as requested via memory manager 585, based on the preferences indicated by the various stream components (e.g., driver(s) 542, driver extension(s) 544, and MFT(s) 546). Stream server 106 can accordingly provide buffer allocation to the multiple stream components attempting to minimize a number of copies of the buffers. In some cases, buffer managing component 124 can provide handles to buffers already allocated to other stream components where the requested/associated data is the same. Moreover, stream server 106 may provide a handle to the buffer(s) to memory manager 585 as well. In addition, for example, centralized memory allocator 116 associated with a specific stream component can provide for transforming data from such allocated buffers for its corresponding stream component (e.g., to provide the same underlying data in a different format). For example, centralized memory allocator 116 may compress, decompress, modify, etc. the corresponding data, as described above.

The stream components can accordingly store and/or retrieve data in associated buffers via centralized memory allocator 116 (and/or memory manager 585), as described, which may include modifying the data, as described. In addition, storing the data in this regard may include accessing the same buffer in some cases. Application 128 can receive, via memory manager 585, the corresponding data in the buffer that is associated with a given stream component. In an example, an application 128 or stream component that is using the data from an input device can be running in a different process (a consumer process) than a producer process obtaining data via the stream component. The producer process can be created as part of an initialization sequence of an input device, when the application requests to use the input device, or in response to launching an application associated with the input device, for example. Physical memory can be allocated for the data buffer associated with the input device. In particular, the data buffer can be allocated in a virtual address range of the producer process and physical memory can be mapped to the virtual address range. For example, the memory can be allocated by stream server 106 calling a service of the kernel memory manager 580, the graphics memory manager 590, etc. Thus, the physical memory can be system memory which is closely coupled with the CPU, graphics memory which is closely coupled with the GPU, and/or embedded input device memory which is closely coupled with the input device. An address from within each page can be read (or probed) and locked in the physical memory. Locking the memory includes keeping the pages of the data buffer resident in physical memory so that the pages are not paged out to secondary storage. The physical memory can be shared with the calling or consuming application by assigning the physical memory pages to virtual addresses of the consuming process. Thus, different virtual addresses can map to the same physical address. The mappings of the producer virtual addresses, the consumer virtual addresses, and the physical addresses can be kept in a memory descriptor list or other data structure. A memory descriptor list can be an array or linked list of valid memory locations.

Figure 6:
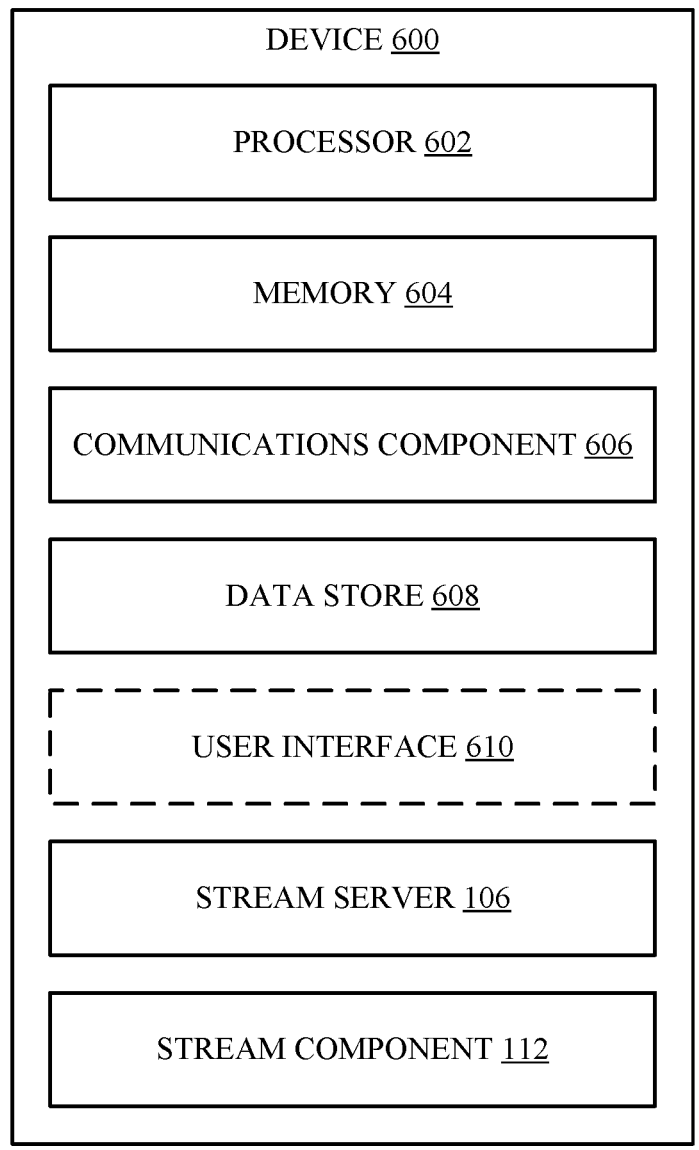
FIG. 6 is a schematic diagram of an example of a device for performing functions described herein.

FIG. 6 illustrates an example of device 600, similar to or the same as device 100 (FIG. 1), including additional optional component details as those shown in FIG. 1. In one implementation, device 600 may include processor 602, which may be similar to processor 102 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 104 such as for storing local versions of applications being executed by processor 602, such as stream server 106, stream component 112, applications related instructions, parameters, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc., utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with implementations described herein. For example, data store 608 may be or may include a data repository for applications and/or related parameters (e.g., stream server 106, stream component 112, applications, etc.) not currently being executed by processor 602. In addition, data store 608 may be a data repository for stream server 106, stream component 112, applications, and/or one or more other components of the device 600.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include a stream server 106, as described, for managing buffer allocation for a plurality of stream component 112 via a centralized memory allocator, obtaining, aggregating, correlating, etc., data from the plurality of stream components 112, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for allocating buffers for multiple components, comprising:

providing, by a stream server, an interface to a centralized memory allocator for allocating at least one buffer in a memory to each of the multiple components, wherein each of the multiple components is one of a driver initialized by an operating system for receiving data from a sensor device, a driver extension or media foundation transform (MFT) initialized by an operating system for modifying data received from a sensor device;

initializing, by the stream server, an instance of the centralized memory allocator based at least in part on a request received from a component of the multiple components via the interface;

allocating, by the stream server via the instance of the centralized memory allocator, the at least one buffer for the component in the memory;

receiving, by the stream server via the instance of the centralized memory allocator, data for storing in the at least one buffer;

modifying, by the stream server, the data to generate modified data stored in the at least one buffer;

receiving, by the stream server via the instance of the centralized memory allocator, a request from the component to deallocate the at least one buffer; and allocating, based on receiving the request from the component to deallocate the at least one buffer, at least a portion of memory previously allocated to the at least one buffer to another buffer for another component of the multiple components.

2. The method of claim 1, wherein modifying the data includes adding one or more flags to the data to generate the modified data, wherein the one or more flags indicate that the data is managed by the centralized memory allocator.

3. The method of claim 1, wherein modifying the data includes adding one or more flags to the data to generate the modified data, wherein the one or more flags indicate that the data is shareable with other components.

4. The method of claim 1, wherein modifying the data includes compressing the data to generate the modified data.

5. The method of claim 1, wherein modifying the data includes decompressing the data to generate the modified data.

6. The method of claim 1, further comprising modifying at least a size of the at least one buffer for the component in managing the memory for other instances of the centralized memory allocator.

7. The method of claim 1, further comprising deallocating a second buffer to a second component of the multiple components, and allocating at least a portion of memory previously allocated to the second buffer to the at least one buffer for the component.

8. The method of claim 1, further comprising exposing the modified data stored in the at least one buffer to one or more other components via a different interface.

9. The method of claim 1, wherein the memory corresponds to kernel memory accessible by the stream server.

10. A device for allocating buffers for multiple components, comprising:

a memory storing one or more parameters or instructions for executing a stream server, wherein the stream server interfaces with the multiple components, wherein each of the multiple components is one of a driver initialized by an operating system for receiving data from a sensor device, a driver extension or media foundation transform (MFT) initialized by an operating system for modifying data received from a sensor device; and at least one processor coupled to the memory, wherein the at least one processor is configured to:
provide an interface to a centralized memory allocator for allocating at least one buffer in the memory to each of the multiple components;
initialize an instance of the centralized memory allocator based at least in part on a request received from a component of the multiple components via the interface;
allocate, via the instance of the centralized memory allocator, the at least one buffer for the component in the memory;
receive, via the instance of the centralized memory allocator, data for storing in the at least one buffer;
modify the data to generate modified data stored in the at least one buffer;
receive, via the instance of the centralized memory allocator, a request from the component to deallocate the at least one buffer; and
allocate, based on receiving the request from the component to deallocate the at least one buffer, at least a portion of memory previously allocated to the at least one buffer to another buffer for another component of the multiple components.

11. The device of claim 10, wherein the at least one processor is configured to modify the data at least in part by adding one or more flags to the data to generate the modified data, wherein the one or more flags indicate that the data is managed by the centralized memory allocator.

12. The device of claim 10, wherein the at least one processor is configured to modify the data at least in part by adding one or more flags to the data to generate the modified data, wherein the one or more flags indicate that the data is shareable with other components.

13. The device of claim 10, wherein the at least one processor is configured to modify the data at least in part by compressing the data to generate the modified data.

14. The device of claim 10, wherein the at least one processor is configured to modify the data at least in part by decompressing the data to generate the modified data.

15. The device of claim 10, wherein the at least one processor is further configured to modify at least a size of the at least one buffer for the component in managing the memory for other instances of the centralized memory allocator.

16. The device of claim 10, wherein the at least one processor is further configured to deallocate a second buffer to a second component of the multiple components, and allocate at least a portion of memory previously allocated to the second buffer to the at least one buffer for the component.

17. The device of claim 10, wherein the at least one processor is further configured to expose the modified data stored in the at least one buffer to one or more other components via a different interface.

18. The device of claim 10, wherein the memory corresponds to kernel memory accessible by the stream server.

19. A non-transitory computer-readable medium, comprising code executable by one or more processors for allocating buffers for multiple components, the code comprising code for:

providing, by a stream server, an interface to a centralized memory allocator for allocating at least one buffer in a memory to each of the multiple components, wherein each of the multiple components is one of a driver initialized by an operating system for receiving data from a sensor device, a driver extension or media foundation transform (MFT) initialized by an operating system for modifying data received from a sensor device;

initializing, by the stream server, an instance of the centralized memory allocator based at least in part on a request received from a component of the multiple components via the interface;

allocating, by the stream server via the instance of the centralized memory allocator, the at least one buffer for the component in the memory;

receiving, by the stream server via the instance of the centralized memory allocator, data for storing in the at least one buffer;

modifying, by the stream server, the data to generate modified data stored in the at least one buffer;

receiving, by the stream server via the instance of the centralized memory allocator, a request from the component to deallocate the at least one buffer; and allocating, based on receiving the request from the component to deallocate the at least one buffer, at least a portion of memory previously allocated to the at least one buffer to another buffer for another component of the multiple components.

20. The non-transitory computer-readable medium of claim 19, wherein the code for modifying the data adds one or more flags to the data to generate the modified data, wherein the one or more flags indicate that the data is managed by the centralized memory allocator.

* * * * *